(12) United States Patent
Yamana et al.

(10) Patent No.: US 7,387,837 B2
(45) Date of Patent: Jun. 17, 2008

(54) THERMOPLASTIC POLYURETHANE COMPOSITION AND PROCESS FOR PRODUCING THE SAME

(75) Inventors: Yoshihiro Yamana, Okayama (JP); Hiroyuki Ono, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 118 days.

(21) Appl. No.: 11/399,450

(22) Filed: Apr. 7, 2006

(65) Prior Publication Data

US 2006/0177669 A1    Aug. 10, 2006

Related U.S. Application Data

(62) Division of application No. 10/352,945, filed on Jan. 29, 2003, now Pat. No. 7,084,207.

(30) Foreign Application Priority Data

Jan. 29, 2002 (JP) ............................... 2002-19711

(51) Int. Cl.
*B32B 27/08* (2006.01)
*B32B 27/40* (2006.01)
*B32B 27/32* (2006.01)
*B32B 27/34* (2006.01)

(52) U.S. Cl. ............................. 428/423.1; 264/171.23; 264/173.11; 264/173.12; 264/173.14; 264/173.16; 264/173.19; 428/423.2; 428/423.5; 428/424.2; 428/424.4

(58) Field of Classification Search ............. 428/423.1, 428/423.2, 424.2, 424.4, 423.5; 264/171.23, 264/173.11, 173.12, 173.14, 173.16, 173.19
See application file for complete search history.

(56) References Cited

U.S. PATENT DOCUMENTS

| 4,423,185 A   | 12/1983 | Matsumoto et al. |
| 4,464,438 A * | 8/1984  | Lu .............................. 428/516 |
| 5,912,193 A * | 6/1999  | Iwata et al. .................. 442/102 |
| 6,790,391 B2  | 9/2004  | Watkins |

FOREIGN PATENT DOCUMENTS

| CA | 2123053 | 11/1994 |
| EP | 0 624 463 | 11/1994 |
| EP | 0 657 505 | 6/1995 |
| EP | 0 748 829 | 12/1996 |
| JP | 57-87447 | 5/1982 |
| JP | 58-022163 | 2/1983 |
| JP | 02-206634 | 8/1990 |
| JP | 02-258341 | 10/1990 |
| JP | 03-005143 | 1/1991 |
| JP | 3-175032 | 7/1991 |
| JP | 03-255288 | 11/1991 |
| JP | 7-133425 | 5/1995 |
| JP | 07-195635 | 8/1995 |
| JP | 07-324162 | 12/1995 |
| JP | 8-48871 | 2/1996 |
| JP | 9-183200 | 7/1997 |
| JP | 10-71686 | 3/1998 |
| JP | 10-110154 | 4/1998 |
| JP | 2000-248073 | 9/2000 |
| JP | 2001-49053 | 2/2001 |
| JP | 2001-49069 | 2/2001 |
| JP | 2001-514318 | 9/2001 |
| WO | WO 96/39886 | 12/1996 |
| WO | WO 99/11711 | 3/1999 |

OTHER PUBLICATIONS

Patent Abstracts of Japan, JP 03-175032, Jul. 30, 1991.
Derwent Abstracts, AN 2000-632246, XP-002240348, JP 2000-248073, Sep. 12, 2000.

* cited by examiner

*Primary Examiner*—Ana Woodward
(74) *Attorney, Agent, or Firm*—Oblon, Spivak, McClelland, Maier & Neustadt, P.C.

(57) ABSTRACT

The present invention provides a thermoplastic polyurethane composition which comprises an ethylene-vinyl alcohol copolymer and/or a polyamide, and a thermoplastic polyurethane, in which the retention of melt tension thereof, when kept in a molten state at 220° C. for 1 hour, determined by the following equation (1), is not less than 10%.

Retention of melt tension (%)=[Melt tension after being kept in a molten state/Melt tension before being kept in a molten state]×100     (1)

The thermoplastic polyurethane composition of the present invention is excellent in production stability of a molded article, and can provide a molded article excellent in appearance because the progress of gelation thereof is suppressed even in a molten state.

12 Claims, No Drawings

THERMOPLASTIC POLYURETHANE COMPOSITION AND PROCESS FOR PRODUCING THE SAME

CROSS REFERENCES TO RELATED APPLICATIONS

This application is a divisional of U.S. patent application Ser. No. 10/352,945, now U.S. Pat. No. 7,084,207.

BACKGROUND OF THE INVENTION

1. Field of the Invention

The present invention relates to a thermoplastic polyurethane composition comprising a thermoplastic polyurethane and an ethylene-vinyl alcohol copolymer and/or a polyamide.

2. Description of the Related Art

A thermoplastic polyurethane has been widely used because it is excellent in various properties such as mechanical strength, flexibility, elastic recovery from strain and abrasion resistance. A film, a sheet, a belt, a hose, a tube and other various articles may be produced with a thermoplastic polyurethane by extrusion molding or injection molding.

An article, made of a thermoplastic polyurethane and having good gas barrier property, has been required. For example, multi-layered structures having a layer of a thermoplastic polyurethane and a layer of an ethylene-vinyl alcohol copolymer or a polyamide, each of which is known as a polymer having excellent gas barrier property, are proposed [see Japanese Patent Application Laid-open Nos. 22163/1983 (JPA 58-022163), 258341/1990 (JPA 2-258341), 5143/1991 (JPA 3-005143) and 110154/1998 (JPA 10-110154)].

A process for producing an article made of a thermoplastic polyurethane and an ethylene-vinyl alcohol copolymer or a polyamide inevitably causes a scrap such as(i) a lug of a film which is involved by co-extrusion process, (ii) trimmings which is involved by co-extrusion blow molding process and (iii) defective moldings. It is desirable to reuse such a scrap from the viewpoint of production cost and resource saving.

In addition, it is also desirable to recycle an article made of a thermoplastic polyurethane and an ethylene-vinyl alcohol copolymer or a polyamide.

Various attempts have been applied for the recycle of an article made of an ethylene-vinyl alcohol copolymer. For example, Japanese Patent Application Laid-open No. 195635/1995 (JPA 7-195635) discloses a method for the recycle of a multi-layered structure having a layer of an ethylene-vinyl alcohol copolymer and a layer of a polyolefin. Also, U.S. Pat. No. 6,294,602 and Japanese Patent Application Laid-open No. 248073/2000 (JPA 2000-248073) disclose a method for the recycle of an article made of a polymer composition comprising an ethylene-vinyl alcohol copolymer, a polyamide and a copolymer of an olefin and an unsaturated carboxylic acid. However, these documents are silent with a method for the recycle of an article made of an ethylene-vinyl alcohol copolymer and a thermoplastic polyurethane.

A thermoplastic polyurethane composition comprising a thermoplastic polyurethane and an ethylene-vinyl alcohol copolymer and/or a polyamide may be formulated by melting [i] an article made of a thermoplastic polyurethane and an ethylene-vinyl alcohol copolymer and/or a polyamide or [ii] a scrap involved by a process for producing an article made of a thermoplastic polyurethane and an ethylene-vinyl alcohol copolymer and/or a polyamide. However, in most cases, a combined use of a thermoplastic polyurethane and an ethylene-vinyl alcohol copolymer and/or a polyamide tends to cause gelation upon melt molding.

Japanese Patent Application Laid-open Nos. 206634/1990 (JPA 2-206634) and 255288/1991 (JPA 3-255288) disclose a uniform thermoplastic polyurethane composition, which can be formulated without gelation, comprising a thermoplastic polyurethane and an ethylene-vinyl alcohol copolymer having specific ethylene content. Japanese Patent Application Laid-open No. 324162/1995 (JPA 7-324162) also discloses a polymer composition comprising a thermoplastic polyurethane dispersed in a matrix of a polyamide. The present inventors have found that, even with such a uniform composition, gelation may proceed at a molten state to cause a reduction of melt tension of the composition, which leads to lesser processability upon extrusion molding or injection molding.

SUMMARY OF THE INVENTION

It is desired to give a thermoplastic polyurethane composition comprising a thermoplastic polyurethane and an ethylene-vinyl alcohol copolymer and/or a polyamide, which can be formulated without gelation and is suppressed in the progress of gelation even at a molten state. The object of the present invention is to provide such a thermoplastic polyurethane composition and a process for producing thereof.

The present inventors have made intensive studies to find that a melt kneading of a specific compound together with a thermoplastic polyurethane and an ethylene-vinyl alcohol copolymer and/or a polyamide can give a uniform thermoplastic polyurethane composition without gelation and can suppress the progress of gelation of the resulting composition in a molten state. The present invention is made upon such findings.

The present invention provides a thermoplastic polyurethane composition comprising a thermoplastic polyurethane and an ethylene-vinyl alcohol copolymer and/or a polyamide, in which the retention of melt tension thereof, when kept in a molten state at 220° C. for 1 hour, is not less than 10%.

The thermoplastic polyurethane composition of the present invention includes, as a preferred embodiment, ones that is formulated using, as at least a part of its raw material, (i) a scrap which is involved by the production of an article made of at least one polymer selected from the group consisting of a thermoplastic polyurethane, an ethylene-vinyl alcohol copolymer and a polyamide and/or (ii) a used article which is made of at least one polymer selected from the group consisting of a thermoplastic polyurethane, an ethylene-vinyl alcohol copolymer and a polyamide, wherein said article can include {i} an article which is made of at least two kinds of polymer selected from the group consisting of a thermoplastic polyurethane, an ethylene-vinyl alcohol copolymer and a polyamide and {ii} a multi-layered structure having a layer of a thermoplastic polyurethane and a layer of an ethylene-vinyl alcohol copolymer and/or a polyamide.

The present invention also provides a process for producing the thermoplastic polyurethane composition of the present invention comprising melt kneading a compound having a hydroxy group and molecular weight not lower than 50 together with a thermoplastic polyurethane and an ethylene-vinyl alcohol copolymer and/or a polyamide.

The process of the present invention includes, as a preferred embodiment, ones that employ, as at least a part of its raw material, (i) a scrap which is involved by the production of an article made of at least one polymer selected from the group consisting of a thermoplastic polyurethane, an ethylene-vinyl alcohol copolymer and a polyamide and/or (ii) a used article which is made of at least one polymer selected from the group consisting of a thermoplastic polyurethane, an ethylene-vinyl alcohol copolymer and a polyamide.

In addition, the present invention provides a molded article made of the thermoplastic polyurethane composition of the present invention, wherein said molded article can include a multi-layered structure having a layer of a thermoplastic polyurethane, a layer of an ethylene-vinyl alcohol copolymer and/or a polyamide and a layer of the thermoplastic polyurethane composition of the present invention.

DETAILED DESCRIPTION OF THE
PREFERRED EMBODIMENTS

A conventionally known thermoplastic polyurethane can be used as a component of the thermoplastic polyurethane composition of the present invention. From the viewpoint of flexibility and mechanical properties, the Shore A hardness of the thermoplastic polyurethane falls preferably between 60 and 97, more preferably between 65 and 95.

The thermoplastic polyurethane, which is employed in the present invention, can be prepared from a high polymer polyol, an organic isocyanate and a chain extender.

A conventionally known high polymer polyol can be used as a high polymer polyol constituting the thermoplastic polyurethane. From the viewpoint of the properties of the thermoplastic polyurethane, and from the viewpoint of the suppression of the molding failure such as a fish-eye and a granular structure, and the suppression of the failure of a molding machine during the continuous melt molding of the thermoplastic polyurethane for a long time, the number average molecular weight of the high polymer polyol preferably falls within a range of 300 to 10000, and more preferably within a range of 500 to 8000. Here, the number-average molecular weight of the high polymer polyol referred to in this specification means, in any case, the number-average molecular weight based on its hydroxyl value as measured in accordance with JIS K-1577.

Whereas, from the viewpoint of the interlaminar strength between the layer of the thermoplastic polyurethane composition of the present invention and a layer of an ethylene-vinyl alcohol copolymer or a polyamide, when formulated into a multi-layered structure, the crystallization enthalpy ($\Delta H$) of the high polymer polyol is preferably not more than 70 J/g. Here, the crystallization enthalpy ($\Delta H$) referred to in the present invention can be determined by means of a differential scanning calorimetry [DSC]. Specifically, it means the value determined in accordance with the method described in the following examples. The crystallization enthalpy ($\Delta H$) of the high polymer polyol is more preferably not more than 50 J/g.

In addition, the present inventors have found that a thermoplastic polyurethane made of a high polymer polyol having a crystallization enthalpy of not more than 70 J/g shows excellent interlaminar strength when formulated into a multi-layered structure having a layer of said thermoplastic polyurethane and an ethylene-vinyl alcohol copolymer or a polyamide. Especially, a thermoplastic polyurethane which is made of a high polymer polyol having a crystallization enthalpy of not more than 70 J/g and having a number average molecular weight of from 300 to 1800 is found to be preferable because it can continuously produce, for a long time and without an operational failure of a molding machine, a multi-layered structure having a layer of said thermoplastic polyurethane and a layer of an ethylene-vinyl alcohol copolymer or a polyamide without causing a fisheye or a granular structure.

The high polymer polyol can include, for example, polyester polyols, polycarbonate polyols, polyester-polycarbonate polyols, polyether polyols, polyolefin polyols, conjugated diene polymer based polyols, castor oil based polyols, silicone based polyols and vinylic polymer based polyols. Among them, polyester polyols, polycarbonate polyols, polyester-polycarbonate polyols and polyether polyols are preferred.

The polyester polyols can be prepared from a dicarboxylic acid component and a diol component, and if necessary, together with another component by a conventional polymerization method such as an esterification and an ester interchange. The polyester polyols can be also prepared by a ring-opening polymerization of lactones under the presence of a diol component.

The dicarboxylic acid component can include an aliphatic dicarboxylic acid having 4 to 12 carbon atoms such as succinic acid, glutaric acid, adipic acid, pimelic acid, suberic acid, azelaic acid, sebacic acid, dodecane dicarboxylic acid, methyl succinic acid, 2-methylglutaric acid, 3-methylglutaric acid, trimethyladipic acid, 2-methyloctane dicarboxylic acid, 3,8-dimethyldecane dicarboxylic acid and 3,7-dimethyldecane dicarboxylic acid; a cycloaliphatic dicarboxylic acid such as cyclohexane dicarboxylic acid, dimer acid and hydrogenated product of dimer acid; an aromatic dicarboxylic acid such as terephthalic acid, isophthalic acid, orthophthalic acid and naphthalene dicarboxylic acid; a polyfunctionalized carboxylic acid such as trimellitic acid and pyromellitic acid; and derivatives thereof which can form esters, such as carboxylic acid esters and acid anhydrides. One or more of these compounds can be used as a dicarboxylic acid component.

The diol component can include an aliphatic diol having 2 to 15 carbon atoms such as ethylene glycol, diethylene glycol, triethylene glycol, propylene glycol, 1,3-propanediol, 2-methyl-1,3-propanediol, 2,2-diethyl-1,3-propanediol, 1,3-butanediol, 1,4-butanediol, 2-methyl-1,4-butanediol, neopentylglycol, 1,5-pentanediol, 3-methyl-1,5-pentanediol, 1,6-hexanediol, 1,7-heptanediol, 1,8-octanediol, 2-methyl-1,8-octanediol, 2,7-dimethyl-1,8-octanediol, 1,9-nonanediol, 2-methyl-1,9-nonanediol, 2,8-dimethyl-1,9-nonanediol and 1,10-decanediol; a cycloaliphatic diol such as 1,4-cyclohexanediol, cyclohexanedimethanol and cyclooctanedimethanol; an aromoatic diol such as 1,4-bis($\beta$-hydroxyethoxy)benzene; and a polyhydric alcohol having not less than 3 hydroxy groups such as trimethylolpropane, trimethylolethane, glycerin, 1,2,6-hexanetriol, pentaerythritol and diglycerin. One or more of these compounds can be used as a diol component.

The lactones can include, for example, $\epsilon$-caprolactone and $\beta$-methyl-$\delta$-valerolactone.

In order to produce the polyester polyol having a crystallization enthalpy ($\Delta H$) of not more than 70 J/g, at least one of the following conditions (1) and (2) is preferably satisfied.

(1) At least a part of the dicarboxylic acid component for the polyester polyol is a dicarboxylic acid having a side chain; and (2) At least a part of the diol component for the polyester polyol is a diol having a side chain.

The total number of moles of the dicarboxylic acid having a side chain and the diol having a side chain is preferably not less than 10%, more preferably not less than 30%, and still more preferably not less than 50% based on the total number of moles of the dicarboxylic acid component and the diol component for the polyester polyol.

An aliphatic dicarboxylic acid, having 5 to 14 carbon atoms and a saturated or unsaturated branched aliphatic hydrocarbon chain with two carboxyl groups on both ends thereof, or its derivative is preferable for the dicarboxylic acid having a side chain. The dicarboxylic acid having a side chain can include 2-methylsuccinic acid, 3-methylglutaric acid, 2-methyladipic acid, 3-methyladipic acid, 3-methylpentane dicarboxylic acid, 2-methyloctane dicarboxylic acid, 3,7-dimethylsebacic acid, 3,8-dimethylsebacic acid, citraconic acid, mesaconic acid and derivatives thereof such as carboxylic acid diesters and dicarboxylic acid anhydrides. One or more of these compounds can be used.

An aliphatic diol, having 4 to 10 carbon atoms and a saturated or unsaturated branched aliphatic hydrocarbon chain with two hydroxy groups on both ends thereof is preferable for the diol having a side chain. The diol having a side chain can include 2methyl-1,3-propanediol, 2,2-diethyl-1,3-propanediol, 2-methyl-1,4-butanediol, neopentylglycol, 3-methyl-1,5-pentanediol, 2-methyl-1,8-octanediol, 2,7-dimethyl-1,8-octanediol, 2-methyl-1,9-nonanediol, 2,8-dimethyl-1,9-nonanediol and 2-methyl-2-butene-1,4-diol. One or more of these compounds can be used. Among them, 3-methyl-1,5-pentanediol, 2-methyl-1,8-octanediol or a mixture of 3-methyl-1,5-pentanediol and 2-methyl-1,8-octanediol is more preferred.

One or more of these polyester polyols can be used as a raw material for the thermoplastic polyurethane.

Polyester polyols can be prepared under the presence of a catalyst such as a titanium catalyst and a tin catalyst. Titanium catalyst can include titanic acid, tetraalkoxy titanium compounds such as tetraisopropyl titanate, tetra-n-butyl titanate, tetra-2-ethylhexyl titanate and tetrastearyl titanate; titanium acylates such as polyhydroxytitanium stearate and polyisopropoxytitanium stearate; titanium chelate compounds such as titanium acetylacetonate, triethanoamine titanate, titanium ammonium lactate and titanium ethyl lactate; etc.

Tin catalyst includes dialkyl tin diacetates such as dibutyl tin diacetate, dialkyl tin dilaurate such as dibutyl tin dilaurate, dialkyl tin bismercaptocarboxylates such as dibutyl tin bis(ethoxybutyl-3-mercaptopropionate); etc.

The amount of the titanium catalyst, if used, is preferably from 0.1 to 50 ppm, more preferably from 1 to 30 ppm, relative to the total weight of the reactants. The amount of the tin catalyst, if used, is preferably from 1 to 200 ppm, more preferably from 5 to 100 ppm, relative to the total weight of the reactants.

Where polyester polyols are produced in the presence of a titanium catalyst, it is desirable that the titanium catalyst remaining in the polyester polyols produced is deactivated. The polyester polyol, in which the remaining titanium catalyst is deactivated, can give a thermoplastic polyurethane having excellent properties such as resistance to hydrolysis.

To deactivate the titanium catalyst remaining in the polyester polyols, for example, employable are [1] a method of bringing the polyester polyols into contact with water under heat to deactivate the titanium catalyst remaining therein, and [2] a method of treating the polyester polyols with phosphorus compounds such as phosphoric acid, phosphates, phosphorous acid and phosphites. Where the titanium catalyst is deactivated through contact with water, 1% by weight or more of water may be added to the polyester polyols and heated at 70° C. to 150° C., preferably 90° C. to 130° C., for from 1 to 3 hours. The deactivation of the titanium catalyst can be effected at atmospheric pressure or under elevated pressure. It is desirable that the pressure in the system is reduced after the deactivation of the titanium catalyst since water as added to the system for the deactivation can be removed quickly.

The polycarbonate polyols can include those obtained by the reaction of a diol component and a carbonate compound. The diol component, which constitutes the polycarbonate polyols, can include ones illustrated above as a diol component for the polyester polyols. The carbonate compound can include dialkyl carbonates such as dimethyl carbonate and diethyl carbonate; alkylene carbonates such as ethylene carbonate; and diaryl carbonates such as diphenyl carbonate. One or more of these polycarbonate polyols can be used as a raw material for the thermoplastic polyurethane.

In order to produce the polycarbonate polyol having a crystallization enthalpy ($\Delta H$) of not more than 70 J/g, at least a part of the diol component is preferably a diol having a side chain. The diol component having a side chain can include ones illustrated above as a component for the polyester polyols. The amount of the diol having a side chain is preferably not less than 10 mol %, more preferably not less than 30 mol %, and still more preferably not less than 50 mol % based on the diol component.

The polyester polycarbonate polyols can include (a) those obtained by the reaction of a diol component, a dicarboxylic acid component and a carbonate compound; (b) those obtained by the reaction of a carbonate compound and a previously prepared polyester polyol and/or polycarbonate polyol; and (c) those obtained by the reaction of a previously prepared polycarbonate polyol, a diol component and a dicarboxylic acid component.

The diol component and dicarboxylic acid component each for constituting the polyester polycarbonate polyol can include those illustrated above as components each for constituting the polyester polyol.

One or more of these polyester polycarbonate polyols can be used as a raw material for the thermoplastic polyurethane.

In order to produce the polyester polycarbonate polyol having a crystallization enthalpy ($\Delta H$) of not more than 70 J/g, it is preferable to use a polyester polyol having a crystallization enthalpy ($\Delta H$) of not more than 70 J/g, and/or a polycarbonate polyol having a crystallization enthalpy ($\Delta H$) of not more than 70 J/g, for the case (b) or (c). Alternatively, for the case (a), at least one of the following conditions (3) and (4) is satisfied.

(3) At least a part of the dicarboxylic acid component for the polyester polycarbonate polyol is a dicarboxylic acid having a side chain; and (4) At least a part of the diol component for the polyester polyol is a diol having a side chain.

The total number of moles of the dicarboxylic acid having a side chain and the diol having a side chain is preferably not less than 10%, more preferably not less than 30%, and still more preferably not less than 50% based on the total number of moles of the dicarboxylic acid component and the diol component for the polyester polycarbonate polyol.

The polyether polyols can include polyether diols prepared by the ring-opening polymerization of a cyclic ether such as ethylene oxide, propylene oxide, trimethylene oxide tetrahydrofuran and methyltetrahydrofuran; and polyether diols prepared by the polymerization of a glycol such as ethylene glycol, propylene glycol, 1,4-butanediol, neopentyl glycol, 1,6-hexanediol, 3-methyl-1,5-pentanediol, 2-methyl-1,8-octanediol, 1,9-nonanediol or 1,10-decanediol. One or more of these polyether polyols can be used as a raw material for the thermoplastic polyurethane.

To obtain the polyether polyol having a crystallization enthalpy (ΔH) of not more than 70 J/g, it is preferred to use a branched compound for the cyclic ether or the glycol.

The conjugated diene polymer based polyols or the polyolefin polyols can include a polyisoprene polyol, a polybutadiene polyol, a poly(butadiene/isoprene) polyol, a poly(butadiene/acrylonitrile) polyol, a poly(butadiene/styrene) polyol, and a hydrogenated product thereof, prepared by polymerizing a conjugated diene such as butadiene or isoprene, or a conjugated diene and another monomer, by a living polymerization method, or the like in the presence of a polymerization initiator, followed by a reaction with an epoxy compound. One or more of these conjugated diene polymer based polyols or the polyolefin polyols can be used as a raw material for the thermoplastic polyurethane.

The organic isocyanate for the thermoplastic polyurethane can include aromatic diisocyanates such as 4,4'-diphenylmethane diisocyanate, phenylene diisocyanate, toluylene diisocyanate, xylylene diisocyanate, 1,5-naphthylene diisocyanate and 3,3'-dichloro-4,4'-diphenylmethane diisocyanate; aliphatic or alicyclic diisocyanates such as hexamethylene diisocyanate, isophorone diisocyanate, 4,4'-dicyclohexylmethane diisocyanate and hydrogenated xylylene diisocyanate; etc. One or more of these organic isocyanates can be used. Among them, preferred is 4,4'-diphenylmethane diisocyanate. If required, small amounts of tri-functional or higher poly-functional polyisocyanates, such as triphenylmethane triisocyanate, can be added to the organic diisocyanate.

The chain extender for the thermoplastic polyurethane can include, as a preferred example, a compound having a molecular weight of not more than 300 and having two or more active hydrogen atoms capable of reacting with isocyanate group, examples of which are diols such as ethylene glycol, propylene glycol, 1,4-butanediol, 1,6-hexanediol, 1,4-bis (β-hydroxyethoxy)benzene, 1,4-cyclohexanedimethanol, bis (β-hydroxyethyl) terephthalate, xylylene glycol; diamines such as hydrazine, ethylenediamine, propylenediamine, isophoronediamine, piperazine, piperazine derivatives, phenylenediamine, toluylenediamine, xylylenediamine, adipic acid dihydrazide and isophthalic acid dihydrazide; aminoalcohols such as aminoethyl alcohol and aminopropyl alcohol; etc. One or more of these compounds can be used. Among them, preferred is an aliphatic diol having 2 to 10 carbon atoms. More preferred is 1,4-butanediol, because it can give a thermoplastic polyurethane having excellent properties such as heat resistance and hot water resistance.

The method for producing the thermoplastic polyurethane can include conventional method such as "prepolymer process" and "one-shot process" utilizing melt polymerization or solution polymerization. In particular, it is preferable to employ the melt polymerization substantially in the presence of no solvent to give the intended thermoplastic polyurethane. More preferred is continuous melt polymerization using multi-screw extruders.

The preparation of the thermoplastic polyurethane can be conducted in the presence of a urethanating tin catalyst. It is desirable to conduct the preparation of the thermoplastic polyurethane in the presence of a urethanating tin catalyst in an amount of 0.5 to 15 ppm, calculated as the tin atom, based on the total weight of the raw materials used, because the thermoplastic polyurethane having a high molecular weight can be obtained. The thermoplastic polyurethane thus obtained in the presence of a urethanating tin catalyst shows excellent processability and gives a molded article having high transparency and good appearance with little fish-eye.

The urethanating tin catalyst includes dibutyltin diacetate, dibutyltin dilaurate, dibutyltin bis (3-ethoxybutyl-3-mercaptopropionate), etc.

The degree of polymerization of the thermoplastic polyurethane is, in consideration of the mechanical properties and processability, preferably such that the thermoplastic polyurethane as dissolved in N,N-dimethylformamide at a concentration of 0.5 dl/g can have an inherent viscosity at 30° C. of at least 0.3 dl/g, more preferably at least 0.5 dl/g.

The thermoplastic polyurethane can contain a crosslinking agent curable by ultraviolet or electron rays such as trimethylolpropane trimethacrylate, trimethylolpropane triacrylate and trimethylolpropane triglycidyl ether.

The thermoplastic polyurethane can contain other polymers such as a styrene-butadiene rubber [SBR], a natural rubber, an ethylene propylene diene terpolymer [EPDM], a liquid polyisoprene, a block copolymer of styrene and butadiene, an olefin-based elastomer, soft acrylic resin and polyvinylchloride. The thermplastic polyurethane can also contain fillers such as glass beads, glass fibers, talc, calcium carbonate, mica and clay. In addition, the thermoplastic polyurethane can contain, if necessary, conventionally used additives such as heat stabilizers, antioxidants, ultraviolet absorbents, flame retardants, lubricants, colorants, hydrolysis inhibitors, nucleating agents, weather resistance improving agents and antifungal agents.

Such crosslinking agents, other polymers, fillers and additives can be added during or after the preparation of the thermoplastic polyurethane.

As the ethylene-vinyl alcohol copolymer, which is another component of the thermoplastic polyurethane composition of the present invention, the one having an ethylene content of 10 to 60 mol % is preferably used, and the one having an ethylene content of 20 to 60 mol % is more preferably used, from the viewpoint of the gas barrier property, the processability and the compatibility with the thermoplastic polyurethane, and further from the viewpoint of the interlaminar strength when formulated into a multi-layered structure with a thermoplastic polyurethane. Further, as the ethylene-vinyl alcohol copolymer, the one having a degree of saponification of not less than 90% is preferably used.

The ethylene-vinyl alcohol copolymer may be the one prepared from the copolymerization of components other than ethylene and vinyl acetate, as long as it does not depart from the scope of the present invention.

The ethylene-vinyl alcohol copolymer preferably has a melt index determined in accordance with ASTM D-1238-65T of 0.1 to 25 g/10 min [determined at 190° C. and under the load of 2160 g] from the viewpoint of the processability. The melt index is more preferably 0.3 to 20 g/10 min.

The ethylene-vinyl alcohol copolymer can be used alone. Also, a mixture of not less than two of the ethylene-vinyl alcohol copolymers having different ethylene content, degree of saponification, melt index and the like may be used.

The ethylene-vinyl alcohol copolymer can contain carboxylic acids such as acetic acid, propionic acid and lactic acid; alkali metal salts of carboxylic acids such as sodium acetate, potassium acetate, sodium propionate, potassium propionate, sodium lactate and potassium lactate; phosphoric acid compounds and alkali metal salts thereof such as phosphoric acid, phosphorous acid, sodium phosphate, lithium phosphate, sodium dihydrogenphosphate and potassium dihydrogenphosphate; boric acid compound and alkali metal salts or ester derivatives thereof such as orthoboric acid, metaboric acid, tetraboric acid, sodium borate, lithium borate, triethylborate, trimethylborate and borax; etc.

Examples of the method for allowing the ethylene-vinyl alcohol copolymer to contain the above-described compound can include (1) a method in which an ethylene-vinyl alcohol copolymer in powdery, granular, spherical or cylindrical pellet form is immersed in an aqueous solution of the above-described compound, if required, followed by drying; (2) a method in which an ethylene-vinyl alcohol copolymer and the above-described compound are melt blended; and (3) a method in which an ethylene-vinyl alcohol copolymer is dissolved in an appropriate solvent, and the above-described compound are mixed therein.

The ethylene-vinyl alcohol copolymer can contain, if necessary, additives such as softening agents, heat stabilizers, antioxidants, ultraviolet absorbents, flame retardants, lubricants, colorants, hydrolysis inhibitors, nucleating agents, weather resistance improving agents and antifungal agents.

The polyamide can include ones obtained by the ring-opening polymerization of a cyclic lactam, ones obtained by the polymerization of an ω-aminocarboxylic acid, and ones obtained by the polymerization of a dicarboxylic acid component and a diamine component. One or more of these polyamides can be used.

The lactam can contain ε-caprolactam, enanthlactam, caprilactam, laurolactam and α-pyrolidone. The ω-aminocarboxylic acid can include 6-aminocaproic acid, 7-aminoheptanoic acid, 9-aminononanoic acid and 11-aminoundecanoic acid.

The dicarboxylic acid component can include aliphatic dicarboxylic acids such as malonic acid, dimethylmalonic acid, succinic acid, 3,3-diethylsuccinic acid, glutaric acid, 2,2-dimethylglutaric acid, adipic acid, sebacic acid and suberic acid; alicyclic dicarboxylic acids such as 1,3-cyclopentanedicarboxylic acid and 1,4-cyclohexanedicarboxylic acid; aromatic dicarboxylic acids such as terephthalic acid, isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4, 4'-dicarboxylic acid and 4,4'-biphenyldicarboxylic acid.

The diamine component can include aliphatic diamines such as ethylenediamine, propylenediamine, 1,4-tetramethylenediamine, 1,6-hexanediamine, 1,8-octanediamine, 1,9-nonanediamine, 1,10-decanediamine, 1,12-dodecanediamine, 2-methyl-1,5-pentanediamine, 3-methyl-1,5-pentanediamine, 2,2,4-trimethyl-1,6-hexanediamine, 2-methyl-1,8-octanediamine and 5-methyl-1,9-nonanediamine; cycloaliphatic diamines such as cyclohexanediamine, methylcyclohexanediamine and isophoronediamine; aromatic diamines such as p-phenylenediamine, m-phenylenediamine, xylylenediamine, 4,4'-diaminodiphenylmethane, 4,4'-diaminodiphenylsulfone and 4,4'-diaminodiphenylether.

The polyamide can contain fillers such as glass beads, glass fibers, talc, calcium carbonate, mica and clay. In addition, the polyamide can contain, if necessary, conventionally used additives such as heat stabilizers, antioxidants, ultraviolet absorbents, flame retardants, lubricants, colorants, hydrolysis inhibitors, nucleating agents, weather resistance improving agents and antifungal agents.

With respect to the thermoplastic polyurethane composition of the present invention, the weight ratio of the thermoplastic polyurethane based on the total weight of the ethylene-vinyl alcohol copolymer and the polyamide falls between 98/2 and 2/98.

The thermoplastic polyurethane composition of the present invention is required to have a retention of melt tension thereof, when kept in a molten state at 220° C. for 1 hour, of not less than 10%.

The retention of melt tension is the value calculated in accordance with the following equation (I), and corresponds to the degree of progress of gelation when the thermoplastic polyurethane composition is kept in a molten state. When the retention of melt tension is less than 10%, the gelation remarkably proceeds when the thermoplastic polyurethane composition comprising an ethylene-vinyl alcohol copolymer and/or a polyamide, and a thermoplastic polyurethane is kept in a molten state, which does not meet the object of the present invention.

Retention of melt tension (%)=[Melt tension after being kept in a molten state/Melt tension before being kept in a molten state]×100    (I)

The retention of melt tension of the thermoplastic polyurethane composition of the present invention, when kept in a molten state at 220° C. for 1 hour, is preferably not less than 15%, and more preferably not less than 20%.

The melt tension referred to in the present invention means the tension observed when the thermoplastic polyurethane composition has been molten, the resulting melt has been extruded in the air as a strand, and the strand is taken back at a given rate.

The thermoplastic polyurethane composition of the present invention has, in general, a melt tension of not less than 0.1 g when extruded in the air at a rate of 2 m/min from a nozzle having a diameter of 1 mm at 220° C. and taken back at a rate of 5 m/min.

The thermoplastic polyurethane composition of the present invention can be prepared by subjecting [a] a thermoplastic polyurethane, [b] an ethylene-vinyl alcohol copolymer and/or a polyamide and [c] an organic compound having a hydroxy group and molecular weight of not less than 50 to melt kneading.

When the molecular weight of the organic compound having a hydroxy group is less than 50, the organic compound is so volatile that it becomes difficult to melt knead it together with an ethylene-vinyl alcohol copolymer and/or a polyamide, and a thermoplastic polyurethane.

The upper limit of the molecular weight of the organic compound having a hydroxy group is, in general, not more than about 20000. The molecular weight of the organic compound having a hydroxy group preferably falls within a range of 60 to 18000.

The organic compound having a hydroxy group is preferably an organic compound having an alcoholic hydroxy group. Further, the average number of hydroxy groups per molecule of the compound falls within a range of preferably 1 to 5, more preferably 1.5 to 4, and still more preferably 2 to 3.5.

Organic compound having a hydroxy group can include monoalcohols having not less than 3 carbon atoms such as n-propanol, n-butanol, n-pentanol, n-octanol and benzylalcohol; diols having not less than 2 carbon atoms such as ethylene glycol, propylene glycol, butanediol, 2-methyl-1, 4-butanediol, pentanediol, 3-methyl-1,5-pentanediol, hexanediol, heptanediol, octanediol, 2-methyl-1,8-octanediol, nonanediol, decanediol and cyclohexanedimethanol; polyhydric alcohols having not less than 3 carbon atoms such as glycerin, trimethylolpropane, butanetriol, hexanetriol, trimethylolbutane, trimethylolpentane and pentaerythritol; styrene-conjugated diene coplymer having hydroxy group at a polymer end and the hydrogenated product thereof; high polymer polyols such as polyesyer polyols, polyether polyols, polycarbonate polyols, polyester polycarbonate polyols and polyplefin polyols. High polymer polyols can include ones illustrated above as a raw material for the thermoplastic polyurethane. The polyurethane prepolymer, which can be obtained by the reaction of the high polymer polyol, the chain extender and the organic isocyanate in such an amount that the total moles of the hydroxy group of the reactant is higher than the total moles of the isocyanate group of the reactant, can be also used as the organic compound having a hydroxy group. One or more of these organic compounds can be used. Among them, diols, polyhydric alcohols and high polymer polyols are preferred.

The amount of the organic compound having a hydroxy group falls preferably between 0.5 and 50 part by weight based on the 100 part by weight of the sum of the thermoplastic polyurethane, the ethylene-vinyl alcohol copolymer and the polyamide.

The melt kneading of an ethylene-vinyl alcohol copolymer and/or a polyamide, a thermoplastic polyurethane and an organic compound having a hydroxy group and a molecular weight of not less than 50 can be carried out by a known apparatus such as a single-screw or twin-screw extruder, a mixing roll or a kneader. It is preferably carried out by a twin-screw extruder.

The melt kneading can be carried out at a temperature in the range of preferably 150 to 250° C., and more preferably 180 to 230° C.

The respective components may be dry blended prior to melt kneading.

And the respective components are, prior to melt kneading, desirably subjected to a drying treatment by means of a dryer or the like in order to suppress the moisture absorption. Further, the hopper opening of the molding machine is desirably sealed with an inert gas such as dried air or nitrogen.

The thermoplastic polyurethane composition of the present invention can be formulated, by various molding methods such as extrusion molding, injection molding, blow molding, calendar molding, press molding, compression molding, vacuum forming and air pressure forming, into molded articles having various shapes such as a film, a sheet or a pipe; a bag-like article obtained from a film or a sheet, an article obtained by thermally processing a sheet, an article obtained by blow molding, an article obtained by pressing and stacking [i.e. dry lamination] with previously molded films or sheets, and a molded article obtained from injection molding.

A composite article can be formulated from the thermoplastic polyurethane composition of the present invention and another material. The another material can include polyolefins such as a polyethylene, a polypropylene, an ethylene-propylene copolymer and a polybutene; olefin based copolymers such as an ethylene-vinyl acetate copolymer, an ethylene-ethyl acetate copolymer and an ionomer resin; thermoplastic polymers such as a thermoplastic polyurethane, an ethylene-vinyl alcohol copolymer, a polyamide, a polyvinylidene chloride, a polyvinyl chloride, a polyester, a polycarbonate, an acrylic polymer, an ABS resin and a polyacrylonitrile; metals such as aluminum, copper and nickel; papers; non-woven fabrics; etc. Among them, a thermoplastic polyurethane, an ethylene-vinyl alcohol copolymer and a polyamide are preferred.

Examples of the method for producing a composite article can include an extrusion lamination, a dry lamination, an extrusion blow molding, a co-extrusion lamination, a co-extrusion sheet molding, a co-extrusion pipe molding, a co-extrusion blow molding, a co-injection molding and a solution coating. The composite article may also be subjected to secondary processing by vacuum forming, air pressure forming, blow molding and the like, if desired.

The composite article can include multi-layered structures formed of a plurality of layers. Such composite article include the ones having various shapes such as a multi-layered sheet, a multi-layered film and a tube of a multi-layered structure.

Specific examples of the multi-layered structure include multi-layered structures having a layer made of a thermoplastic polyurethane, a layer made of an ethylene-vinyl alcohol copolymer and/or a polyamide, and a layer made of the thermoplastic polyurethane composition of the present invention. Among them, the one having a layer made of the thermoplastic polyurethane composition of the present invention as its outermost layer has a high practical utility.

The number of the layers (A) made of a thermoplastic polyurethane, the layers (B) made of an ethylene-vinyl alcohol copolymer and/or a polyamide, and the layers (C) made of the thermoplastic polyurethane composition of the present invention in such a multi-layered structure has no particular restriction. Further, the multi-layered structure may include a layer (D) made of another material.

Examples of another material can include other resins such as polyester based resins, polycarbonate based resins, polyether based resins, polyvinyl chloride based resins, ethylene-vinyl acetate copolymer resins, polyalkyl acrylate based resins and polyolefin based resins; papers; fabrics; and metals such as aluminum, copper and nickel.

The layer (A) of a thermoplastic polyurethane and the layer (B) of an ethylene-vinyl alcohol copolymer and/or a polyamide are desirably stacked directly one on another. However, the interposition of a layer (AD) of an interlaminar adhesive therebetween is not excluded if it does not depart from the scope of the present invention.

Examples of such an interlaminar adhesive can include polyolefins such as a polyethylene and a polypropylene, prepared by adding or grafting an ethylenically unsaturated carboxylic acid or an anhydride thereof such as maleic anhydride; ethylene-vinyl acetate copolymers and copolymers of ethylene and an ethylene-acrylic acid ester such as methyl ester and ethyl ester.

Examples of the configuration of the multi-layered structure can include (C)/(A)/(B), (A)/(B)/(A)/(C), (C)/(A)/(B)/(A)/(C), (C)/(A)/(B)/(D)/(B)/(A)/(C), (C)/(AD)/(A)/(B), and (C)/(AD)/(A)/(B)/(A)/(AD)/(C), wherein (A) is the abbreviation of the layer (A) of a thermoplastic polyurethane; (B), the layer (B) made of an ethylene-vinyl alcohol copolymer and/or a polyamide; (C), the layer (C) made of the thermoplastic polyurethane composition of the present invention; (D), the layer (D) made of another material; and (AD), the layer (AD) of an interlaminar adhesive.

The thickness of such layers constituting the multi-layered structure has no particular restriction. It is adjusted according to the properties of the thermoplastic polyurethane, the ethylene-vinyl alcohol copolymer or the polyamide, constituting the multi-layered structure, the number of the layers of the multi-layered structure, the molding method of the multi-layered structure, the intended use of the multi-layered structure, and the like. However, in general, it is preferably so configured that, the layer (A) of a thermoplastic polyurethane has a thickness within a range of 10 to 5000 μm per layer, the layer (B) of an ethylene-vinyl alcohol copolymer and/or a polyamide has a thickness within a range of 1 to 1000 μm per layer, and the layer (C) made of the thermoplastic polyurethane composition of the present invention has a thickness within a range of 50 to 10000 μm per layer from the viewpoint of the ease of production of the multi-layered structure, the interlaminar strength between the respective layers and so on.

The ratio of the thicknesses of the layer (A) of a thermoplastic polyurethane to the layer (B) of an ethylene-vinyl alcohol copolymer and/or a polyamide is, in general, falls within the range of 100/1 to 1/100.

The multi-layered structure is efficiently produced by co-extrusion of a polyurethane, an ethylene-vinyl alcohol copolymer, a polyamide and the thermoplastic polyurethane composition of the present invention. Alternatively, it can also be produced by the following steps in which a multi-layered structure having the layer (A) made of a polyurethane and the layer (B) made of an ethylene-vinyl alcohol copolymer and/or a polyamide is produced [step 1], and the layer (C) made of the thermoplastic polyurethane composition of the present invention is formed on the surface of the resulting multi-layered structure by extrusion molding, injection molding, solution coating or the like [step 2].

The thermoplastic polyurethane composition of the present invention can be used for various applications in which the gas barrier property or the flexibility is required. For example, the thermoplastic polyurethane compositions of the present invention are useful as materials for various uses such as packaging materials for oxygen-sensitive food and medicals; packaging materials for apparel; packaging materials for other products; construction materials such as window frame materials, wallpapers and decorative sheets; electrical insulating films; base materials for adhesive films and tapes; marking films; agricultural films; films for lamination with metal sheets or other materials; uses of apparel and sundry goods such as table cloths, rain coats, umbrellas, curtains, mats and coverings; various industrial parts with packings for sealing purpose or other purposes; automobile interior components such as assist grips, handles and air bag coverings; sport goods such as goggles; bag-like goods such as shoes, trunks and bags; box-like goods; decorative materials for a furniture; tubes, belts, hoses, tires, various rolls, screens, casters, gears, packing materials, linings, electric wire cladding materials, various joints, valve components and machine parts.

In the present invention, as a preferred embodiment, it is possible to use (i) a scrap generated during the production of an article made of a thermoplastic polyurethane, an ethylene-vinyl alcohol copolymer or a polyamide and/or (ii) a used article made of a thermoplastic polyurethane, an ethylene-vinyl alcohol copolymer or a polyamide, as at least a part of the raw materials for the thermoplastic polyurethane composition.

Example of the article can include (I) an article made of one polymer such as a foam, a fiber, a sheet or a film of a thermoplastic polyurethane; or a foam, a fiber, a sheet or a film of a polyamide; (II) various articles composed of a polymer composition comprising not less than two polymers such as a thermoplastic polyurethane and an ethylene-vinyl alcohol copolymer, or a thermoplastic polyurethane and a polyamide; and (III) a multi-layered structure having a layer made of a thermoplastic polyurethane, and a layer made of an ethylene-vinyl alcohol copolymer and/or a polyamide.

The molded article can be produced by various molding methods such as extrusion molding, injection molding, blow molding, and calender molding. Examples of the scrap generated during the production process of the article can include a discharged product generated upon start-up or upon completion of production of an article or a multi-layered structure, trimmings at opposite ends of a film or a sheet generated during production thereof, sprue generated during production of a multi-layered structure by injection molding or blow molding, and low quality goods in the production of an article and a multi-layered structure.

Examples of the used article can include products after having been used by common consumers, recovered products from industrial wastes and crushed pieces thereof.

The melt kneading of such a scrap and/or a used article together with an ethylene-vinyl alcohol copolymer or a polyamide, a thermoplastic polyurethane and an organic compound having a hydroxy group and a molecular weight of not lower than 50 can give the thermoplastic polyurethane composition of the present invention.

When the scrap or the used article contains an ethylene-vinyl alcohol copolymer or a polyamide as an ingredient, it is possible to omit the use of an ethylene-vinyl alcohol copolymer or a polyamide in the foregoing melt kneading. Whereas, when the scrap or the used article contains a thermoplastic polyurethane as an ingredient, it is possible to omit the use of a thermoplastic polyurethane in the foregoing melt kneading. Further, when the scrap or the used article contains a thermoplastic polyurethane and an ethylene-vinyl alcohol copolymer and/or a polyamide as ingredients, if desired, it is also possible to omit the use of both an ethylene-vinyl alcohol copolymer and/or a polyamide and a thermoplastic polyurethane.

The thermoplastic polyurethane composition of the present invention can be produced by melt kneading of the scrap and/or the used article together with only an organic compound having a hydroxy group and a molecular weight not lower than 50 with respect to the following cases.

Case 1: The scrap is the one generated during the production of an article made of {a} a thermoplastic polyurethane and an ethylene-vinyl alcohol copolymer and/or a polyamide or made of {b} a polymer composition comprising a thermoplastic polyurethane, an ethylene-vinyl alcohol copolymer and/or a polyamide.

Case 2: The used article is the used one made of {a} a thermoplastic polyurethane and an ethylene-vinyl alcohol copolymer and/or a polyamide or made of {b} a polymer composition comprising a thermoplastic polyurethane, an ethylene-vinyl alcohol copolymer and/or a polyamide.

The proportion of the scrap or the used article in the raw materials for the thermoplastic polyurethane composition of the present invention can be determined according to the various conditions such as the compositions of the scrap and the used article, the degree of degradation of the components constituting the scrap and the used article.

When the scrap and the used article are employed as at least a part of the raw materials for the thermoplastic polyurethane composition of the present invention, the operation of melt kneading, the conditions thereof, and the like is not particularly changed from the foregoing ones.

Whereas, the amount of the organic compound having a hydroxy group can be determined in the following manner. The weights of the ethylene-vinyl alcohol copolymer, the polyamide and the thermoplastic polyurethane derived from the scrap and the used article are added to calculate the total weight of the ethylene-vinyl alcohol copolymer, the polyamide and the thermoplastic polyurethane to be used as the raw materials for the thermoplastic polyurethane composition of the present invention. Then, the amount of the organic compound having a hydroxy group is adjusted to fall within the range described previously based on the calculated weight. With a more simple calculation process, the organic compound having a hydroxy group is used in an amount of 0.5 to 50 parts by weight per a total weight of 100 parts by weight of the scrap and the used article, the ethylene-vinyl alcohol copolymer, the polyamide and the thermoplastic polyurethane.

EXAMPLES

Now, the invention is described in more detail hereinbelow with reference to the following Examples and Comparative Examples, which are provided for the purposes of illustration only, however, and are not intended to restrict the scope of the invention.

In the following Examples and Comparative Examples, the number average molecular weight and the crystallization enthalpy ($\Delta H$) of the high polymer polyols, the inherent viscosity and the Shore A hardness of the thermoplastic polyureythane, the interlaminar strength between a layer of the thermoplastic polyurethane and a layer of the ethylene-vinyl alcohol copolymer of the multi-layered structure, the melt tension and the retention of the melt tension of the thermoplastic polyurethane composition, and the appearance of the molded article were measured and evaluated according to the methods mentioned below.

Number Average Molecular Weight of a High Polymer Polyol

The number average molecular weight of each polymer polyol sample was calculated on the basis of its hydroxyl value as measured in accordance with JIS K 1577.

Crystallization Enthalpy ($\Delta H$) of a High Polymer Polyol

Using a scanning differential calorimeter ["Rigaku Thermal Analysis Station TAS10 Model", produced by Rigaku Denki Co.], the crystallization enthalpy ($\Delta H$) of each high polymer polyol sample was measured. The amount of the sample was about 10 mg. The quantity of heat of the sample was measured in a nitrogen stream [100 ml/min] under the conditions shown below. From the peak area observed in the step 3, the crystallization enthalpy ($\Delta H$) of the sample was calculated.

Thermal Analysis Condition

Step 1: The sample was heated from room temperature to 100° C. at a rate of temperature rise of 100° C./min. The sample was then kept at 100° C. for 3 minutes.

Step 2: The sample was cooled from 100° C. to –100° C. at a rate of temperature down of 10° C. min. The sample was then kept at –100° C. for 1 minute.

Step 3: The sample was heated from –100° C. to 100° C. at a rate of temperature rise of 10° C./min.

Inherent Viscosity of a Thermoplastic Polyurethane

A sample of the thermoplastic polyurethane was dissolved in N,N-dimethylformamide to give a solution having a concentration of 0.5 g/dl. Using an Ubbelohde's viscometer, the flow down time of the resulting solution at 30° C. was measured. The inherent viscosity $\eta inh$ of the sample solution was calculated as follows.

$\eta inh=[\ln (t_1/t_0)]/C$ (dl/g);

wherein $t_0$ means flow down time [seconds] of the solvent, $t_1$ means flow down time [seconds] of the sample solution and C means concentration of the sample solution.

Shore A Hardness of a Thermoplastic Polyurethane

A test piece having a length of 100 mm, a width of 100 mm and a thickness of 12 mm was prepared by injection molding of each polyurethane. The Shore A hardness of the test piece was measured by a Shore A hardness tester in accordance with JIS K 6301.

Interlaminar Strength in a Multi-Layered Structure

Each of 10 multi-layered films, cut into a size of 11 mm×100 mm, was immersed in a hot water of 80° C. for 3 seconds. Then, the T type peel strength between a layer of a thermoplastic polyurethane and a layer of an ethylene-vinyl alcohol copolymer was measured under the condition of 65% RH at 23° C. by means of a tension tester [Autograph [trade name], manufactured by Shimadzu Corporation].

Melt Tension of the Thermoplastic Polyurethane Composition and Retention Thereof The measurement was carried out by means of "Capirograph" [trade name, manufactured by Toyo Seiki seisaku-sho, LTD.]. Namely, the thermoplastic polyurethane composition was vacuum dried at 90° C. for 1 hour in the unit and charged into a cylinder set at 220° C., and heated for 6 minutes to be molten. Then, the melt was extruded from a nozzle [diameter: 1 mm, L/D=10] set at 220° C. into the air of 25° C. at a rate of 2 m/min, resulting in a strand. The tension at which the resulting strand is taken back at a rate of 5 m/min was measured as a melt tension.

The melt tension of the thermoplastic polyurethane composition observed when the composition was heated for 6 minutes in the cylinder, and then kept at 220° C. for another 54 minutes in the cylinder, by which the total retention time in the cylinder is 1 hour, and then the melt thereof was extruded, is referred to as the "melt tension after being kept in a molten state" which sometimes abbreviated as "MTaft". Whereas, the melt tension of the polymer composition observed when the thermoplastic polyurethane composition was heated for 6 minutes in the cylinder, and then extruded without being kept in the cylinder, is referred to as the "melt tension before being kept in a molten state" which sometimes abbreviated as "MTbef". Thus, the retention [Ret] of the melt tension was calculated in accordance with the following equation:

Ret (%)=[MTaft/MTbef]×100

Appearance of a Molded Article

The appearance of each sheet or multi-layered structure obtained by extrusion molding was visually observed, and evaluated as follows.

A: Neither gels nor fish eyes are observed.

B: Small gels and fish eyes are observed.

C: Presence of gels and fish eyes, and variations in thickness are remarkable.

Abbreviations for the compounds as referred to in the following Examples and Comparative Examples are as follows.

Thermoplastic Polyurethanes

TPU-A: A thermoplastic polyurethane having an inherent viscosity of 0.9 dl/g and a Shore A hardness of 90, prepared by subjecting the polyester polyol having a number average molecular weight of 1000 and a crystallization enthalpy [$\Delta H$] of 0 J/g [abbreviated as "PMPA-1000"], which was obtained by the reaction of 3-methyl-1,5-pentanediol [abbreviated as "MPD"] and adipic acid according to the general procedures described as Referential Example 1, 4,4'-diphenylmethane diisocyanate [abbreviated as "MDI"] and 1,4-butanediol [abbreviated as "BD"] at a molar ratio of PMPA- 1000/MDI/BD=1/2.4/1.4 to polymerization reaction according to the general procedures described as Referential Example 2.

TPU-B: A thermoplastic polyurethane having an inherent viscosity of 0.9 dl/g and a Shore A hardness of 90, prepared by subjecting the polyester polyol having a number average molecular weight of 2000 and a crystallization enthalpy [ΔH] of 35 J/g [abbreviated as "PMPS-2000"], which was obtained by the reaction of 3-methyl-1,5-pentanediol [MPD] and sebacic acid according to the general procedures described as Referential Example 1, 4,4'-diphenylmethane diisocyanate [MDI] and 1,4-butanediol [BD] at a molar ratio of PMPS-2000/MDI/BD=1/4.6/3.6 to polymerization reaction according to the general procedures described as Referential Example 2.

TPU-C: A thermoplastic polyurethane having an inherent viscosity of 0.9 dl/g and a Shore A hardness of 90, prepared by subjecting the polyester polyol having a number average molecular weight of 2000 and a crystallization enthalpy [ΔH] of 36 J/g [abbreviated as "PEPA-2000"], which was obtained by the reaction of adipic acid and a mixture of ethylene glycol [abbreviated as "EG"] and propylene glycol [abbreviated as "PG"] at a molar ratio of EG/PG=5/1 according to the general procedures described as Referential Example 1, 4,4'-diphenylmethane diisocyanate [MDI] and 1,4-butanediol [BD] at a molar ratio of PEPA-2000/MDI/BD=1/4.2/3.2 to polymerization reaction according to the general procedures described as Referential Example 2.

TPU-D: A thermoplastic polyurethane having an inherent viscosity of 0.9 dl/g and a Shore A hardness of 90, prepared by subjecting the polyester polyol having a number average molecular weight of 2000 and a crystallization enthalpy [ΔH] of 77 J/g [abbreviated as "PBA-2000"], which was obtained by the reaction of 1,4-butanediol [Bd] and adipic acid according to the general procedures described as Referential Example 1, 4,4'-diphenylmethane diisocyanate [MDI] and 1,4-butanediol [BD] at a molar ratio of PBA-2000/MDI/BD=1/4.2/3.2 to polymerization reaction according to the general procedures described as Referential Example 2.

TPU-E: A thermoplastic polyurethane having an inherent viscosity of 0.9 dl/g and a Shore A hardness of 90, prepared by subjecting the polyester polyol having a number average molecular weight of 2000 and a crystallization enthalpy [ΔH] of 90 J/g [abbreviated as "PNA-2000"], which was obtained by the reaction of 1,9-nonanediol and adipic acid according to the general procedures described as Referential Example 1, 4,4'-diphenylmethane diisocyanate [MDI] and 1,4-butanediol [BD] at a molar ratio of PBA-2000/MDI/BD=1/4.4/3.4 to polymerization reaction according to the general procedures described as Referential Example 2.

TPU-F: A thermoplastic polyurethane having an inherent viscosity of 0.9 dl/g and a Shore A hardness of 90, prepared by subjecting the poly(tetramethylene)ether glycol having a number average molecular weight of 1000 and a crystallization enthalpy [ΔH] of 90 J/g [abbreviated as "PTMG-1000"], which is commercially available as "PTMG-1000", trade name, made by Mitsubishi Chemical Co., Ltd, 4,4'-diphenylmethane diisocyanate [MDI] and 1,4-butanediol [BD] at a molar ratio of PTMG-1000/MDI/BD=1/2.7/1.7 to polymerization reaction according to the general procedures described as Referential Example 2.

TPU-G: A thermoplastic polyurethane having an inherent viscosity of 0.9 dl/g and a Shore A hardness of 90, prepared by subjecting the polyester polyol having a number average molecular weight of 1500 and a crystallization enthalpy [ΔH] of 0 J/g [abbreviated as "PMPA-1500"], which was obtained by the reaction of 3-methyl-1,5-pentanediol [MPD] and adipic acid according to the general procedures described as Referential Example 1, 4,4'-diphenylmethane diisocyanate [MDI] and 1,4-butanediol [BD] at a molar ratio of PMPA-1500/MDI/BD=1/3.6/2.6 to polymerization reaction according to the general procedures described as Referential Example 2.

TPU-H: A thermoplastic polyurethane having an inherent viscosity of 0.9 dl/g and a Shore A hardness of 90, prepared by subjecting the polyester polyol having a number average molecular weight of 750 and a crystallization enthalpy [ΔH] of 0 J/g [abbreviated as "PMPA-750"], which was obtained by the reaction of 3-methyl-1,5-pentanediol [MPD] and adipic acid according to the general procedures described as Referential Example 1, 4,4'-diphenylmethane diisocyanate [MDI] and 1,4-butanediol [BD] at a molar ratio of PMPA-750/MDI/BD=1/2.02/1.02 to polymerization reaction according to the general procedures described as Referential Example 2.

Ethylene-Vinyl Alcohol Copolymer

EVOH:EVAL E 105, trade name, made by Kuraray Co., Ltd.

Polyamide

PA: UBE Nylon 1013 B, trade name, made by UBE Industries Ltd.

Organic Compounds having a Hydroxy Group

P-1: A polyester polyol having a number average molecular weight of 1000 and 2.4 hydroxy groups in average per 1 molecule, which was obtained by the reaction of adipic acid and a mixture of 3-methyl-1,5-pentanediol [MPD] and trimethylolpropane [abbreviated as "TMP"] at a molar ratio of MPD/TMP=11/1 according to the general procedures described as Referential Example 1.

P-2: Ethylene Glycol [EG; molecular weight: 62]

P-3: Poly(tetramethylene)ether glycol having a number average molecular weight of 1000 [PTMG-1000], which is commercially available as "PTMG-1000", trade name, made by Mitsubishi Chemical Co., Ltd.

P-4: A polyester polyol having a number average molecular weight of 600 and 2.4 hydroxy groups in average per 1 molecule, which was obtained by the reaction of adipic acid and a mixture of 3-methyl-1,5-pentanediol [MPD] and trimethylolpropane [TMP] at a molar ratio of MPD/TMP=7.25/1 according to the general procedures described as Referential Example 1.

P-5: A polyester polyol having a number average molecular weight of 2000 and 2.2 hydroxy groups in average per 1 molecule, which was obtained by the reaction of adipic acid and a mixture of 3-methyl-1,5-pentanediol [MPD] and trimethylolpropane [TMP] at a molar ratio of MPD/TMP=53/1 according to the general procedures described as Referential Example 1, except that no tin catalyst for urethanation was added.

Referential Example 1

General Procedures of Producing a Polyester Polyol

A reactor equipped with a mechanical stirrer and a distiller was charged with 87.4 kg of 3-methyl-1,5-pentanediol [MPD] and 85.9 kg of adipic acid. The resulting mixture was subjected to esterification under atmospheric pressure at 200° C. while removing the formed water from the reactor by distillation. When the acid value of the reaction mixture came to 30 mg KOH/g or less, 180 mg of tetraisopropyl titanate, which is a titanium catalyst for polycondensation, was added to the reaction mixture, and the reaction was further continued while reducing the inner pressure of the reactor to 100 to 200 mmHg. After the acid value of the reaction mixture came to 1.0 mg KOH/g, the inner pressure of the reactor was further reduced gradually by a vacuum pump in order to make the polycondensation reaction proceed to the completion. Next, the reaction mixture was cooled to 100° C., and 3% by weight of water was added thereto and heated for 2 hours while stirring in order to make the titanium catalyst deactivated. Then, excessive amount of water was removed from the reactor by distillation under reduced pressure, and 10 ppm of dibutyltin diacetate, which is a tin catalyst for urethanation, was added. In that manner, polyester polyol having a number average molecular weight of 1500 and a crystallization enthalpy (ΔH) of 0 J/g [PMPA-1500] was obtained.

Referential Example 2

General Procedures of Producing a Polyurethane

A polyester polyol as heated to 80° C., a chain extender as heated to 80° C. and an organic diisocyanate as heated to 50° C. were continuously fed into a twin-screw extruder [30 mm φ, L/D=36] with two screws rotating in the same axial direction, and subjected to continuous melt polymerization at 260° C. while keeping the cylinder temperature of the extruder at 260° C. The melt of the polyurethane produced was continuously extruded into water as a strand. The resulting polyurethane strands were cut in pellets with a pelletizer. The resulting pellets were dried at 80° C. or 24 hours.

Example 1

(1) Production of the Thermoplastic Polyurethane Composition

The previously dried TPU-A, the previously dried EVOH and the organic compound having a hydroxy group (P-1) were continuously fed to achieve the formulation shown in Table 1 into a twin-screw extruder [TEX-30 (trade name), manufactured by the Japan Steel Works, Ltd.; diameter of cylinder: 30 mm, L/D=30], and melt kneaded under the conditions of a cylinder temperature of 190 to 210° C. and a rotation speed of screw of 200 r.p.m. The resulting melt was continuously extruded into water as a strand. Then, the resulting strands were cut in pellets with a pelletizer. The resulting pellets were dried at 60° C. for 4 hours. The melt tension of the resulting composition was measured according to the above-described method. The retention of the melt tension, when kept in a molten state at 220° C. for 1 hour, was also determined. The results are shown in Table 1.

(2) Production of a Molded Article

The composition thus obtained was molten under the condition of a cylinder temperature of 190 to 210° C. by means of a single screw extruder with a cylinder diameter of 25 mm and an L/D=26. The melt was extruded from a T die having a width of 40 cm at a rate of 2 kg/hr to give a sheet with a thickness of 100 μm. The appearance of the sheet obtained upon completion of continuous 10-hour molding was visually observed. The evaluation was "A", that is, neither gels nor fish-eyes were observed. In addition, the production stability during this molding process was good because the screw tip pressure of the extruder showed no variation and the extrusion was also stable.

Examples 2 to 15

A thermoplastic polyurethane, the EVOH, the PA and an organic compound having a hydroxy group shown in Table 1 were continuously fed to achieve the formulation shown in Table 1 into a twin-screw extruder [TEX-30 (trade name), manufactured by the Japan Steel Works, Ltd.; diameter of cylinder: 30 mm, L/D=30], and melt kneaded under the conditions of a cylinder temperature of 190 to 210° C. and a rotation speed of screw of 200 r.p.m. The resulting melt was continuously extruded into water as a strand. Then, the resulting strands were cut in pellets with a pelletizer. The resulting pellets were dried at 60° C. for 4 hours. The melt tension of the resulting composition was measured according to the above-described method. The retention of the melt tension, when kept in a molten state at 220° C. for 1 hour, was also determined. The results are shown in Table 1.

Further, the composition thus obtained was molten under the condition of a cylinder temperature of 190 to 210° C. by means of a single screw extruder with a cylinder diameter of 25 mm and an L/D=26. The melt was extruded from a T die having a width of 40 cm at a rate of 2 kg/hr to give a sheet with a thickness of 100 μm. The appearance of the sheet obtained upon completion of continuous 10-hour is shown in Table 1. In addition, the production stabilities during this molding process are also shown in Table 1.

Comparative Example 1

A thermoplastic polyurethane composition was obtained by the procedures of the step (1) of Example 1, except that the organic compound having a hydroxy group (P-1) was not used. However, the melt tension of the resulting composition cannot be measured, because the molten composition, soon after extruded from the nozzle, turned into small pieces due to its own weight resulting the failure of forming a strand.

The composition thus obtained was molten under the condition of a cylinder temperature of 190 to 210° C. by means of a single screw extruder with a cylinder diameter of 25 mm and an L/D=26. The melt was extruded from a T die having a width of 40 cm at a rate of 2 kg/hr to give a sheet with a thickness of 100 μm. The appearance of the sheet obtained upon completion of continuous 10-hour molding is shown in Table 1. In addition, the production stability during this molding process is also shown in Table 1.

Comparative Example 2

A thermoplastic polyurethane composition was obtained by the procedures of the step (1) of Example 1, except that the amount of the organic compound having a hydroxy group (P-1) was changed as shown in Table 1. The melt tension of the resulting composition was measured according to the above-described method. The retention of the melt tension, when kept in a molten state at 220° C. for 1 hour, was also determined. The results are shown in Table 1.

Further, the composition thus obtained was molten under the condition of a cylinder temperature of 190 to 210° C. by means of a single screw extruder with a cylinder diameter of 25 mm and an L/D=26. The melt was extruded from a T die having a width of 40 cm at a rate of 2 kg/hr to give a sheet with a thickness of 100 μm. The appearance of the sheet obtained upon completion of continuous 10-hour molding is shown in Table 1. In addition, the production stability during this molding process is also shown in Table 1.

TABLE 1

Thermoplastic Polyurethane Compositions

| | TPUs | | EVOH [Part by weight] | PA [Part by weight] | Organic Compound having OH group | [Part by weight] | Melt Tension | | | Molded Article | |
|---|---|---|---|---|---|---|---|---|---|---|---|
| | | [Part by weight] | | | | | MTaft [g] | MTbef [g] | Retention [%] | Appearance | Production stability[1] |
| Ex. 1 | TPU-A | 80 | 20 | — | P-1 | 5 | 12.3 | 16.3 | 75 | A | Good |
| Ex. 2 | TPU-A | 80 | 20 | — | P-1 | 20 | 7.3 | 9.7 | 76 | A | Good |
| Ex. 3 | TPU-A | 80 | — | 20 | P-1 | 5 | 21.7 | 35.0 | 62 | A | Good |
| Ex. 4 | TPU-B | 80 | 20 | — | P-1 | 5 | 11.2 | 17.8 | 63 | A | Good |
| Ex. 5 | TPU-C | 80 | 20 | — | P-1 | 5 | 10.7 | 16.4 | 65 | A | Good |
| Ex. 6 | TPU-D | 80 | 20 | — | P-1 | 5 | 10.1 | 17.7 | 57 | A | Good |
| Ex. 7 | TPU-E | 80 | 20 | — | P-1 | 5 | 12.9 | 17.2 | 75 | A | Good |
| Ex. 8 | TPU-F | 80 | 20 | — | P-1 | 5 | 12.2 | 17.0 | 72 | A | Good |
| Ex. 9 | TPU-A | 80 | 20 | — | P-2 | 5 | 9.7 | 19.3 | 50 | A | Good |
| Ex. 10 | TPU-A | 80 | 20 | — | P-3 | 5 | 6.9 | 16.1 | 43 | A | Good |
| Ex. 11 | TPU-A | 80 | 20 | — | P-4 | 5 | 7.8 | 16.0 | 49 | A | Good |
| Ex. 12 | TPU-A | 90 | 10 | — | P-1 | 10 | 10.3 | 14.9 | 69 | A | Good |
| Ex. 13 | TPU-A | 80 | 80 | — | P-1 | 10 | 13.8 | 22.6 | 61 | A | Good |
| Ex. 14 | TPU-G | 80 | 20 | — | P-1 | 5 | 21.0 | 28.0 | 75 | A | Good |
| Ex. 15 | TPU-H | 80 | 20 | — | P-5 | 5 | 18.0 | 26.1 | 69 | A | Good |
| Comp. Ex. 1 | TPU-A | 80 | 20 | — | — | — | —[2] | —[2] | — | C | * |
| Comp. Ex. 2 | TPU-A | 80 | 20 | — | P-1 | 60 | 0.2 | 2.6 | 7 | B | ** |

[1]Good: The screw tip pressure of the extruder showed no variation and the extrusion was stable.
*The screw tip pressure of the extruder and the extrusion showed remarkable fluctuation, resulting the failure of steady production of the three-layered sheet.
**The screw tip pressure of the extruder and the extrusion involved slight fluctuation.
[2]Melt tension could not be measured.

Example 16

(1) Preparation of a Scrap of a Multi-Layered Structure

By means of a T die type co-extrusion sheet molding device, the previously dried TPU-A and the previously dried EVOH were respectively molten and extruded from two extruders at a cylinder temperature of 210° C., and joined at a joining site of the molten resins. Then, the joined melt was extruded from a T die, and cooled to give a three-layered sheet having a structure of TPU-A layer having a thickness of 100 μm/EVOH layer having a thickness of 50 μm/TPU-A layer having a thickness of 100 μm. The interlaminar strength of the resulting three-layered sheet was determined to be 3.4 kg/cm. Further, the appearance of the sheet obtained upon completion of continuous 10-hour molding was visually observed. The evaluation was "A", that is, neither gels nor fish-eyes were observed. In addition, the production stability during this molding process was good because the screw tip pressure of the extruder showed no variation and the extrusion was also stable. The resulting three-layered sheet was ground in pieces to give a scrap, which is referred to as "S-1".

(2) Production of the Thermoplastic Polyurethane Composition

The scrap (S-1), which had been previously dried, and the organic compound having a hydroxy group (P-1) were continuously fed into a twin-screw extruder [TEX-30 (trade name), manufactured by the Japan Steel Works, Ltd.; diameter of cylinder: 30 mm, L/D=30], wherein the feed rate of the scrap (S-1) was 200 g/min and that of the organic compound (P-1) was 10 g/min, and melt kneaded under the conditions of a cylinder temperature of 190 to 210° C. and a rotation speed of screw of 200 r.p.m. The resulting melt was continuously extruded into water as a strand. Then, the resulting strands were cut in pellets with a pelletizer. The resulting pellets were dried at 60° C. for 4 hours.

The melt tension of the resulting composition was measured according to the above-described method. The retention of the melt tension, when kept in a molten state at 220° C. for 1 hour, was also determined. The results are shown in Table 2.

(3) Production of a Molded Article [Multi-Layered Structure]

By means of a T die type co-extrusion sheet molding device, the previously dried polymer composition obtained in the step (2), the previously dried TPU-A and the previously dried EVOH were respectively molten and extruded from three extruders, and joined at a joining site of the molten resins. Then, the joined melt was extruded from a feed-block type T die set at 210° C., and cooled to give a five-layered sheet having a structure of the thermoplastic polyurethane composition layer having a thickness of 200 μm/TPU-A layer having a thickness of 100 μm/EVOH layer having a thickness of 50 μm/TPU-A layer having a thickness of 100 μm/the thermoplastic polyurethane composition layer having a thickness of 200 μm.

In the above molding procedure, the extrusion of the thermoplastic polyurethane composition was carried out under the condition of a cylinder temperature of 190 to 210° C. by means of a single-screw extruder having a cylinder diameter of 65 mm and an L/D=22. The extrusion of the TPU-A was carried out under the condition of a cylinder temperature of 190 to 210° C. by means of a single-screw extruder having a cylinder diameter of 40 mm and an L/D=26. Whereas, the extrusion of the EVOH was carried out under the condition of a cylinder temperature of 190 to 225° C. by means of a single-screw extruder having a cylinder diameter of 40 mm and an L/D=22.

The appearance of the five-layered sheet obtained upon completion of continuous 10-hour molding is shown in Table 2. In addition, the production stability during this molding process is also shown in Table 2.

Examples 17 to 20

(1) Preparation of a Scrap of a Multi-Layered Structure

A three-layered sheet having a structure of TPU-D layer having a thickness of 100 μm/EVOH layer having a thickness of 50 μm/TPU-D layer having a thickness of 100 μm was produced by the procedures of the step (1) of Example 16, except that the TPU-D was used in place of the TPU-A. The interlaminar strength of the resulting three-layered sheet was determined to be 0.9 kg/cm. Further, the appearance of the sheet obtained upon completion of continuous 10-hour molding was visually observed. The evaluation was "A", that is, neither gels nor fish-eyes were observed. In addition, the production stability during this molding process was good because the screw tip pressure of the extruder showed no variation and the extrusion was also stable. The resulting three-layered sheet was ground in pieces to give a scrap, which is referred to as "S-2".

(2) Production of the Thermoplastic Polyurethane Composition

The scrap (S-1) obtained in the step (1) of Example 16 or the scrap (S-2) obtained above and an organic compound having a hydroxy group shown in Table 2 were continuously fed into a twin-screw extruder [TEX-30 (trade name), manufactured by the Japan Steel Works, Ltd.; diameter of cylinder: 30 mm, L/D=30], wherein the feed rate of the scrap (S-1) or (S-2) was 200 g/min and the feed rates of the organic compounds were 40 g/min for Example 17, 4 g/min for Example 18 and 10 g/min for Examples 19 and 20, and melt kneaded under the conditions of a cylinder temperature of 190 to 210° C. and a rotation speed of screw of 200 r.p.m. The resulting melt was continuously extruded into water as a strand. Then, the resulting strands were cut in pellets with a pelletizer. The resulting pellets were dried at 60° C. for 4 hours. The melt tension of the resulting composition was measured according to the above-described method. The retentions of the melt tension, when kept in a molten state at 220° C. for 1 hour, were also determined. The results are shown in Table 2.

(3) Production of a Molded Article [Multi-Layered Structure]

By means of a T die type co-extrusion sheet molding device, each thermoplastic polyurethane composition obtained above, which had been previously dried, the previously dried thermoplastic polyurethane [TPU-A for Examples 17 to 19; TPU-D for Example 20] and the previously dried EVOH were respectively molten and extruded from three extruders, and joined at a joining site of the molten resins. Then, the joined melt was extruded from a feed-block type T die set at 210° C., and cooled to give a five-layered sheet having a structure of the thermoplastic polyurethane composition layer having a thickness of 200 μm/thermoplastic polyurethane layer having a thickness of 100 μm/EVOH layer having a thickness of 50 μm/thermoplastic polyurethane layer having a thickness of 100 μm/the thermoplastic polyurethane composition layer having a thickness of 200 μm.

In the above molding procedure, the extrusion of the thermoplastic polyurethane composition was carried out under the condition of a cylinder temperature of 190 to 210° C. by means of a single-screw extruder having a cylinder diameter of 65 mm and an L/D=22. The extrusion of the thermoplastic polyurethane was carried out under the condition of a cylinder temperature of 190 to 210° C. by means of a single-screw extruder having a cylinder diameter of 40 mm and an L/D=26. Whereas, The extrusion of the EvOH was carried out under the condition of a cylinder temperature of 190 to 225° C. by means of a single-screw extruder having a cylinder diameter of 40 mm and an L/D=22.

The appearances of the five-layered sheet obtained upon completion of continuous 10-hour molding are shown in Table 2. In addition, the production stabilities during this molding process are also shown in Table 2.

Example 21

(1) Preparation of a Scrap of a Multi-Layered Structure

A three-layered sheet having a structure of TPU-G layer having a thickness of 100 μm/EVOH layer having a thickness of 50 μm/TPU-G layer having a thickness of 100 μm was produced by the procedures of the step (1) of Example 16, except that the TPU-G was used in place of the TPU-A. The interlaminar strength of the resulting three-layered sheet was determined to be 3.4 kg/cm. Further, the appearance of the sheet obtained upon completion of continuous 10-hour molding was visually observed. The evaluation was "A", that is, neither gels nor fish-eyes were observed. In addition, the production stability during this molding process was good because the screw tip pressure of the extruder showed no variation and the extrusion was also stable. The resulting three-layered sheet was ground in pieces to give a scrap, which is referred to as "S-3".

(2) Production of the Thermoplastic Polyurethane Composition

The previously dried scrap (S-3) and the organic compound having a hydroxy group (P-1) were continuously fed into a twin-screw extruder [TEX-30 (trade name), manufactured by the Japan Steel Works, Ltd.; diameter of cylinder: 30 mm, L/D=30], wherein the feed rate of the scrap (S-3) was 200 g/min and that of the organic compound was 10 g/min, and melt kneaded under the conditions of a cylinder temperature of 190 to 210° C. and a rotation speed of screw of 200 r.p.m. The resulting melt was continuously extruded into water as a strand. Then, the resulting strands were cut in pellets with a pelletizer. The resulting pellets were dried at 60° C. for 4 hours. The melt tension of the resulting composition was measured according to the above-described method. The retention of the melt tension, when kept in a molten state at 220° C. for 1 hour, was also determined. The results are shown in Table 2.

(3) Production of a Molded Article [Multi-Layered Structure]

By means of a T die type co-extrusion sheet molding device, the previously dried polymer composition obtained in the above step (2), the previously dried TPU-G and the previously dried EVOH were respectively molten and extruded from three extruders, and joined at a joining site of the molten resins. Then, the joined melt was extruded from a feed-block type T die set at 210° C., and cooled to give a five-layered sheet having a structure of the thermoplastic polyurethane composition layer having a thickness of 200 μm/TPU-G layer having a thickness of 100 μm/EVOH layer having a thickness of 50 μm/TPU-G layer having a thickness of 100 μm/the thermoplastic polyurethane composition layer having a thickness of 200 μm.

In the above molding procedure, the extrusion of the thermoplastic polyurethane composition was carried out under the condition of a cylinder temperature of 190 to 210° C. by means of single-screw extruder having a cylinder diameter of 65 mm and an L/D=22. The extrusion of the TPU-G was carried out under the conditions of a cylinder temperature of 190 to 210° C. by means of a single-screw extruder having a cylinder diameter of 40 mm and an L/D=26. Whereas, the extrusion of the EVOH was carried out under the condition of a cylinder temperature of 190 to 225° C. by means of a single-screw extruder having a cylinder diameter of 40 mm and an L/D=22.

The appearance of the five-layered sheet obtained upon completion of continuous 10-hour molding is shown in Table 2. In addition, the production stability during this molding process is also shown in Table 2.

Example 22

(1) Preparation of a Scrap of a Multi-Layered Structure

A three-layered sheet having a structure of TPU-H layer having a thickness of 100 μm/EVOH layer having a thickness of 50 μm/TPU-H layer having a thickness of 100 μm was produced by the procedures of the step (1) of Example 16, except that the TPU-H was used in place of the TPU-A. The interlaminar strength of the resulting three-layered sheet was determined to be 3.4 kg/cm. Further, the appearance of the sheet obtained upon completion of continuous 10-hour molding was visually observed. The evaluation was "A", that is, neither gels nor fish-eyes were observed. In addition, the production stability during this molding process was good because the screw tip pressure of the extruder showed no variation and the extrusion was also stable. The resulting three-layered sheet was ground in pieces to give a scrap, which is referred to as "S-4".

(2) Production of the Thermoplastic Polyurethane Composition

The previously dried scrap (S-4) and the organic compound having a hydroxy group (P-5) were continuously fed into a twin-screw extruder [TEX-30 (trade name), manufactured by the Japan Steel Works, Ltd.; diameter of cylinder: 30 mm, L/D=30], wherein the feed rate of the scrap (S-4) was 200 g/min and that of the organic compound was 10 g/min, and melt kneaded under the conditions of a cylinder temperature of 190 to 210° C. and a rotation speed of screw of 200 r.p.m. The resulting melt was continuously extruded into water as a strand. Then, the resulting strands were cut in pellets with a pelletizer. The resulting pellets were dried at 60° C. for 4 hours.

The melt tension of the resulting composition was measured according to the above-described method. The retention of the melt tension, when kept in a molten state at 220° C. for 1 hour, was also determined. The results are shown in Table 2.

(3) Production of a Molded Article [Multi-Layered Structure]

By means of a T die type co-extrusion sheet molding device, the previously dried polymer composition obtained in the above step (2), the previously dried TPU-H and the previously dried EVOH were respectively molten and extruded from three extruders, and joined at a joining site of the molten resins. Then, the joined melt was extruded from a feed-block type T die set at 210° C., and cooled to give a five-layered sheet having a structure of the thermoplastic polyurethane composition layer having a thickness of 200 μm/TPU-H layer having a thickness of 100 cm/EVOH layer having a thickness of 50 μm/TPU-H layer having a thickness of 100 μm/the thermoplastic polyurethane composition layer having a thickness of 200 μm.

In the above molding procedure, the extrusion of the thermoplastic polyurethane composition was carried out under the condition of a cylinder temperature of 190 to 210° C. by means of single-screw extruder having a cylinder diameter of 65 mm and an L/D=22. The extrusion of the TPU-H was carried out under the conditions of a cylinder temperature of 190 to 210° C. by means of a single-screw extruder having a cylinder diameter of 40 mm and an L/D=26. Whereas, the extrusion of the EVOH was carried out under the condition of a cylinder temperature of 190 to 225° C. by means of a single-screw extruder having a cylinder diameter of 40 mm and an L/D=22.

The appearance of the five-layered sheet obtained upon completion of continuous 10-hour molding is shown in Table 2. In addition, the production stability during this molding process is also shown in Table 2.

Comparative Example 3

(1) Production of the Thermoplastic Polyurethane Composition

A thermoplastic polyurethane composition was obtained by the procedures of the step (2) of Example 16, except that the organic compound having a hydroxy group (P-1) was not used. However, the melt tension of the resulting composition cannot be measured, because the molten composition, soon after extruded from the nozzle, turned into small pieces due to its own weight resulting the failure of forming a strand.

(2) Production of a Molded Article [Multi-Layered Structure]

By means of a T die type co-extrusion sheet molding device, the previously dried thermoplastic polyurethane composition obtained in the above step (1), the previously dried TPU-A and the previously dried EVOH were respectively molten and extruded from three extruders, and joined at a joining site of the molten resins. Then, the joined melt was extruded from a feed-block type T die set at 210° C., and cooled to give a five-layered sheet having a structure of the thermoplastic polyurethane composition layer having a thickness of 200 μm/TPU-A layer having a thickness of 100 μm/EVOH layer having a thickness of 50 μm/TPU-A layer having a thickness of 100 μm/the thermoplastic polyurethane composition layer having a thickness of 200 μm.

In the above molding procedure, the extrusion of the thermoplastic polyurethane composition was carried out under the condition of a cylinder temperature of 190 to 210° C. by means of single-screw extruder having a cylinder diameter of 65 mm and an L/D=22. The extrusion of the TPU-A was carried out under the conditions of a cylinder temperature of 190 to 210° C. by means of a single-screw extruder having a cylinder diameter of 40 mm and an L/D=26. Whereas, the extrusion of the EVOH was carried out under the condition of a cylinder temperature of 190 to 225° C. by means of a single-screw extruder having a cylinder diameter of 40 mm and an L/D=22. The appearance of the five-layered sheet obtained upon completion of continuous 10-hour molding is shown in Table 2. In addition, the production stability during this molding process is also shown in Table 2.

Comparative Examples 4 and 5

(1) Production of the Thermoplastic Polyurethane Composition

Thermoplastic polyurethane compositions were obtained by the procedures of the step (2) of Example 16, except that the feed rates of the organic compound having a hydroxy group (P-1) were changed to 0.6 g/min for Comparative Example 4 and 120 g/min for Comparative Example 5.

The melt tension of the resulting composition was measured according to the above-described method. The retentions of the melt tension, when kept in a molten state at 220° C. for 1 hour, were also determined. The results are shown in Table 2.

(2) Production of a Molded Article [Multi-Layered Structure]

By means of a T die type co-extrusion sheet molding device, the previously dried thermoplastic polyurethane composition obtained in the above step (1), the previously dried TPU-A and the previously dried EVOH were respectively molten and extruded from three extruders, and joined at a joining site of the molten resins. Then, the joined melt was extruded from a feed-block type T die set at 210° C., and cooled to give a five-layered sheet having a structure of the thermoplastic polyurethane composition layer having a thickness of 200 μm/TPU-A layer having a thickness of 100 μm/EVOH layer having a thickness of 50 μm/TPU-A layer having a thickness of 100 μm/the thermoplastic polyurethane composition layer having a thickness of 200 μm.

In the above molding procedure, the extrusion of the thermoplastic polyurethane composition was carried out under the condition of a cylinder temperature of 190 to 210° C. by means of single-screw extruder having a cylinder diameter of 65 mm and an L/D=22. The extrusion of the TPU-A was carried out under the conditions of a cylinder temperature of 190 to 210° C. by means of a single-screw extruder having a cylinder diameter of 40 mm and an L/D=26. Whereas, the extrusion of the EVOH was carried out under the condition of a cylinder temperature of 190 to 225° C. by means of a single-screw extruder having a cylinder diameter of 40 mm and an L/D=22.

The appearance of the five-layered sheet obtained upon completion of continuous 10-hour molding is shown in Table 2. In addition, the production stability during this molding process is also shown in Table 2.

Example 23

The thermoplastic polyurethane composition obtained in the step (2) of Example 16 was dried. Then, by means of a single screw extruder having a cylinder diameter of 65 mm and an L/D=22, the dried thermoplastic polyurethane composition was extruded from a feed-block type T die, under the condition of a cylinder temperature of 190 to 210° C., on a surface of the three-layered sheet produced by the step (1) of Example 16. The resulting stack was pressed by a pair of nip rolls and cooled to give a four-layered sheet having a structure of the thermoplastic polyurethane composition layer having a thickness of 200 μm/TPU-A layer having a thickness of 100 μm/EVOH layer having a thickness of 50 μm/TPU-A layer having a thickness of 100 μm.

The appearance of the four-layered sheet obtained upon completion of continuous 10-hour molding and the production stability during this molding process were the same as those for the step (3) of Example 16.

Having now fully described the invention, it will be apparent to one of the ordinary skill in the art that many changes and modifications can be made thereto without departing from the spirit or scope of the invention as set forth herein.

This application is based on Japanese Patent Application No. 2002-19711, filed on Jan. 29, 2002, the entire contents of which are hereby incorporated by reference.

The invention claimed is:

1. A multi-layered structure, wherein one of the layers of the multi-layer structure comprises a thermoplastic polyurethane composition comprising an ethylene-vinyl alcohol copolymer and/or a polyamide, and a thermoplastic polyurethane, wherein the retention of melt tension of said thermoplastic polyurethane composition, when kept in a molten state at 220° C. for 1 hour, is not less than 10% wherein said thermoplastic polyurethane composition is produced by melt kneading an ethylene-vinyl alcohol copolymer and/or polyamide, a thermoplastic polyurethane, and in addition an organic compound having a hydroxyl group and a molecular weight of not less than 50, wherein the organic compound having a hydroxyl group is used in an amount of from 0.5 to 20 parts by weight per a total weight

TABLE 2

| | | | | | Thermoplastic Polyurethane Compositions | | | | Molded Article | | |
| | | Scraps [part by weight] | | Organic Compound having OH group [Part by weight] | | Melt Tension | | | [Five-layered sheet] | | |
| | | | | | | MTaft [g] | MTbef [g] | Retention [%] | TPUs | Appearance | Production stability[1] |
|---|---|---|---|---|---|---|---|---|---|---|---|
| Ex. 16 | S-1 [TPU-A/EVOH] | 100 | P-1 | 5 | 12.3 | 16.3 | 70 | TPU-A | A | Good |
| Ex. 17 | S-1 [TPU-A/EVOH] | 100 | P-1 | 20 | 7.8 | 10.7 | 73 | TPU-A | A | Good |
| Ex. 18 | S-1 [TPU-A/EVOH] | 100 | P-2 | 2 | 9.8 | 18.2 | 54 | TPU-A | A | Good |
| Ex. 19 | S-1 [TPU-A/EVOH] | 100 | P-3 | 5 | 7.5 | 16.4 | 46 | TPU-A | A | Good |
| Ex. 20 | S-2 [TPU-D/EVOH] | 100 | P-1 | 5 | 10.3 | 16.7 | 62 | TPU-D | A | Good |
| Ex. 21 | S-3 [TPU-G/EVOH] | 100 | P-1 | 5 | 11.1 | 17.2 | 64 | TPU-G | A | Good |
| Ex. 22 | S-4 [TPU-H/EVOH] | 100 | P-5 | 5 | 11.1 | 17.0 | 65 | TPU-H | A | Good |
| Comp. Ex. 3 | S-1 [TPU-A/EVOH] | 100 | — | — | —[2] | —[2] | — | TPU-A | C | * |
| Comp. Ex. 4 | S-1 [TPU-A/EVOH] | 100 | P-1 | 0.3 | 0.1 | 1.5 | 7 | TPU-A | B | ** |
| Comp. Ex. 5 | S-1 [TPU-A/EVOH] | 100 | P-1 | 60 | 0.1 | 2.7 | 5 | TPU-A | B | ** |

[1]Good: The screw tip pressure of the extruder showed no variation and the extrusion was stable.
*The screw tip pressure of the extruder and the extrusion showed remarkable fluctuation, resulting the failure of steady production of the three-layered sheet.
**The screw tip pressure of the extruder and the extrusion involved slight fluctuation.
[2]Melt tension could not be measured.

of 100 parts by weight of the ethylene-vinyl alcohol copolymer, the polyamide and the thermoplastic polyurethane.

2. The multi-layered structure of claim 1, wherein the layer comprising the thermoplastic polyurethane composition is an outermost layer.

3. The multi-layered structure of claim 1, further comprising a thermoplastic polyurethane layer and a layer of at least one of an ethylene-vinyl alcohol copolymer or a polyamide.

4. The multi-layered structure of claim 3, wherein the layer comprising the thermoplastic polyurethane composition is an outermost layer.

5. A method for producing the multi-layered structure of claim 3, comprising subjecting the thermoplastic polyurethane composition, thermoplastic polyurethane, and at least one of an ethylene-vinyl alcohol copolymer or a polyamide to co-extrusion molding, thereby forming the multi-layer structure.

6. A method for producing the multi-layered structure of claim 3, comprising forming a layer of the thermoplastic polyurethane composition on the surface of a multi-layered structure comprising a layer of a thermoplastic polyurethane and a layer of at least one of an ethylene-vinyl alcohol copolymer or polyamide.

7. A multi-layered structure, wherein one of the layers of the multi-layer structure comprises a thermoplastic polyurethane composition comprising an ethylene-vinyl alcohol copolymer and/or a polyamide, and a thermoplastic polyurethane, wherein the retention of melt tension of said thermoplastic polyurethane composition, when kept in a molten state at 220° C. for 1 hour, is not less than 10% wherein said thermoplastic polyurethane composition is produced by melt kneading an ethylene-vinyl alcohol copolymer and/or polyamide, a thermoplastic polyurethane, and in addition an organic compound having a hydroxyl group and a molecular weight of not less than 50, wherein the organic compound having a hydroxyl group is used in an amount of from 0.5 to 20 parts by weight per a total weight of 100 parts by weight of the ethylene-vinyl alcohol copolymer, the polyamide and the thermoplastic polyurethane, wherein at least a part of the ethylene-vinyl alcohol copolymer, the polyamide or the polyurethane is at least one of (1) a scrap generated during the production of an article comprising at least one polymer selected from the group consisting of a thermoplastic polyurethane, an ethylene-vinyl alcohol copolymer and a polyamide, or (2) a recycled article comprising at least one polymer selected from the group consisting of a thermoplastic polyurethane, an ethylene-vinyl alcohol copolymer and a polyamide.

8. The multi layered structure of claim 7, wherein the layer of the thermoplastic polyurethane composition is an outermost layer.

9. The multi-layered structure of claim 7, further comprising a layer of thermoplastic polyurethane and a layer of at least one of an ethylene-vinyl alcohol copolymer or a polyamide.

10. A method for producing the multi-layered structure of claim 9, comprising subjecting the thermoplastic polyurethane composition, thermoplastic polyurethane, and at least one of an ethylene-vinyl alcohol copolymer or a polyamide to co-extrusion molding.

11. A method for producing the multi-layered structure according to claim 9, comprising forming a layer of the thermoplastic polyurethane composition on the surface of a multi-layered structure having a layer of a thermoplastic polyurethane and a layer of at least one of an ethylene-vinyl alcohol copolymer or a polyamide.

12. The multi-layered structure of claim 9, wherein the layer of the thermoplastic polyurethane composition is an outermost layer.

* * * * *